INVENTOR.
Shayne Linderman,

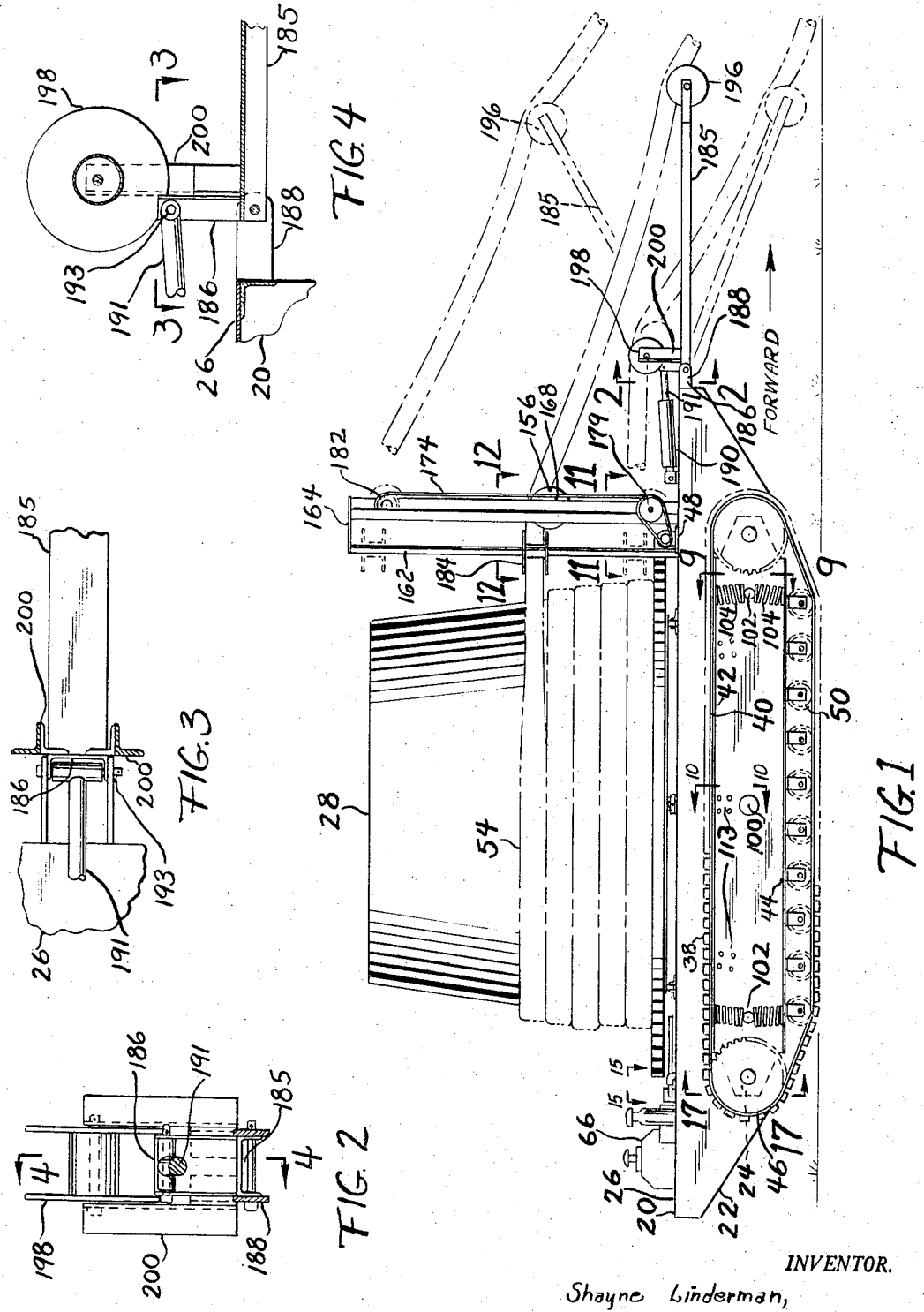

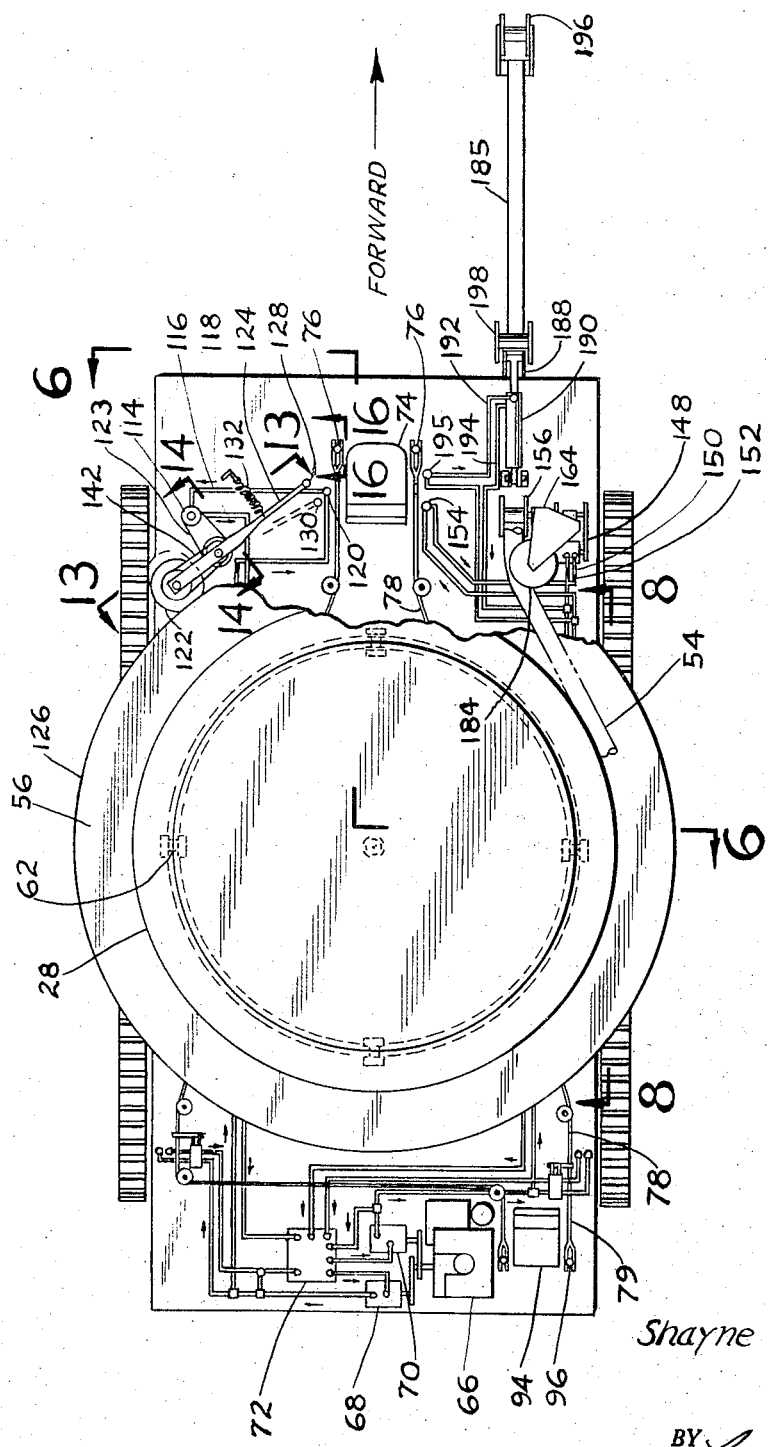

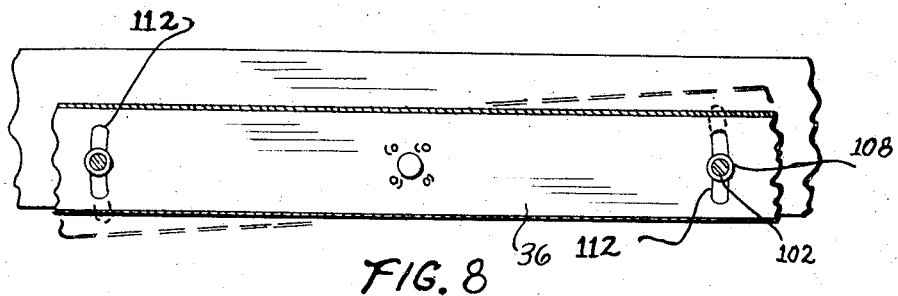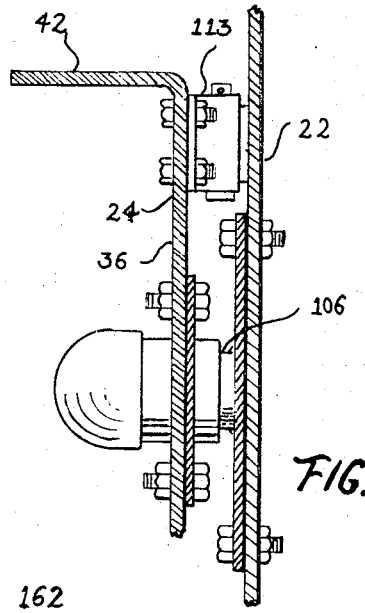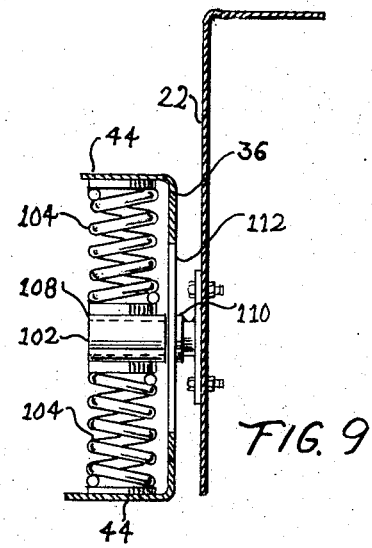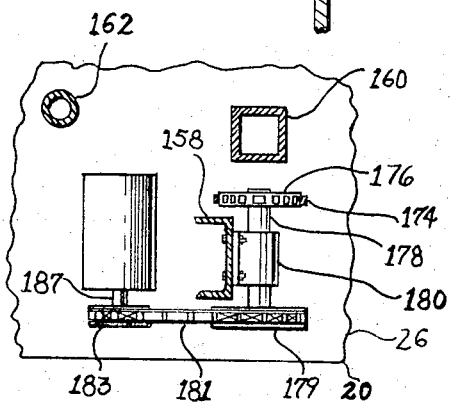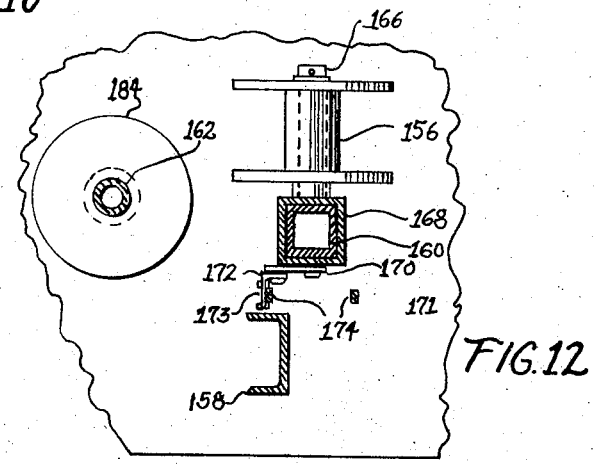

Feb. 13, 1968  S. LINDERMAN  3,368,773
HOSE HANDLING MACHINE
Filed Oct. 21, 1965  5 Sheets-Sheet 5

Shayne Linderman, INVENTOR.
BY Lawrence J. Bente,
Attorney

United States Patent Office 3,368,773
Patented Feb. 13, 1968

3,368,773
HOSE HANDLING MACHINE
Shayne Linderman, Clementsville, Idaho
(130 W. Main, Rexburg, Idaho 83440)
Filed Oct. 21, 1965, Ser. No. 499,547
13 Claims. (Cl. 242—86.2)

ABSTRACT OF THE DISCLOSURE

The present invention provides an apparatus for winding and unwinding irrigation hose, cable, wire and the like from a rotatable drum and provides guide means for lifting the hose and the like from the ground and lowering the hose to the ground as the hose is wound upon the rotatable drum or is unwound therefrom.

In areas where irrigating is done by sprinkling a great problem exists in getting water under pressure to the various locations for sprinkling. A farmer using this type of irrigating must go to much expense in time, labor and cost of pipes in handling the pipes in irrigating by sprinkling.

Metal pipes are used most commonly because they are the most practical to handle under present circumstances. The lengths of pipe can be transported on a conveyance, placed in position end to end where desired, connected and used, then disconnected, reloaded on conveyance, relocated, etc., all with hand labor, but it is slow, tiresome and costly.

Flexible hoses, rather than metal pipes would be satisfactory to use except that they are still more difficult to handle in long lengths being of large capacity without special handling equipment. Long heavy flexible hoses are more difficult to carry or load onto an ordinary conveyance than metal pipes. Present handling methods for metal pipes are very hard on the pipes and there is much unnecessary expense in pipe damage.

Accordingly, I have invented a hose handling machine which is self-propelled and adapted for use with hoses of large capacity and great length and overcomes the difficulties mentioned.

In accordance with the present invention, a machine is provided for picking up, transporting and placing irrigation hoses again onto the ground at any desired location and position.

It is another object of the present invention to provide a hose handling machine of large proportions so that it is capable of carrying its operators and power equipment as well as the special devices for handling the hoses which are of large capacity and of great length.

It is another object of the present invention to provide a hose handling machine with a rotating drum which winds the hoses about itself, powered separately and independently of the other portions of the machine.

It is another object of the present invention to provide control means for controlling rotation of the drum independent of the forward speed of the machine whereby the hoses can be wound at the desired tension for the best care of the hoses and equipment.

It is another object of the present invention to provide an apparatus as part of the hose handling machine for guiding the hoses as they are being wound onto the drum for uniform loading of the drum.

It is another object of the present invention to provide lift control means on the forward end of the machine for lifting the hose off the ground in advance of the approach of the main body of the machine when the hoses are being picked up. When the hoses are being laid out on the ground for sprinkling again, the lift control apparatus relieves the winding guide apparatus of some of its burden. It also prevents kinking and tearing of the hose in both the picking up and laying out operations.

Various other objects and advantages of the present invention will be readily apparent from the following detailed description when considered in connection with the accompanying drawings forming a part thereof, and in which:

FIGURE 1 is a side elevation view of the hose handling machine of the present invention.

FIGURE 2 is an enlarged section taken on line 2—2 of FIGURE 1.

FIGURE 3 is a section taken on line 3—3 of FIGURE 4.

FIGURE 4 is a section taken on line 4—4 of FIGURE 2.

FIGURE 5 is a top plan view of the hose handling machine of the present invention.

FIGURE 8 is an enlarged section taken on line 8—8 of FIGURE 5 showing means for pivoting the track frame with respect to the main frame.

FIGURE 9 is an enlarged section taken on line 9—9 of FIGURE 1.

FIGURE 10 is an enlarged section taken on line 10—10 of FIGURE 1.

FIGURE 11 is an enlarged section taken on line 11—11 of FIGURE 1.

FIGURE 12 is an enlarged section taken on line 12—12 of FIGURE 1.

Figure 7:
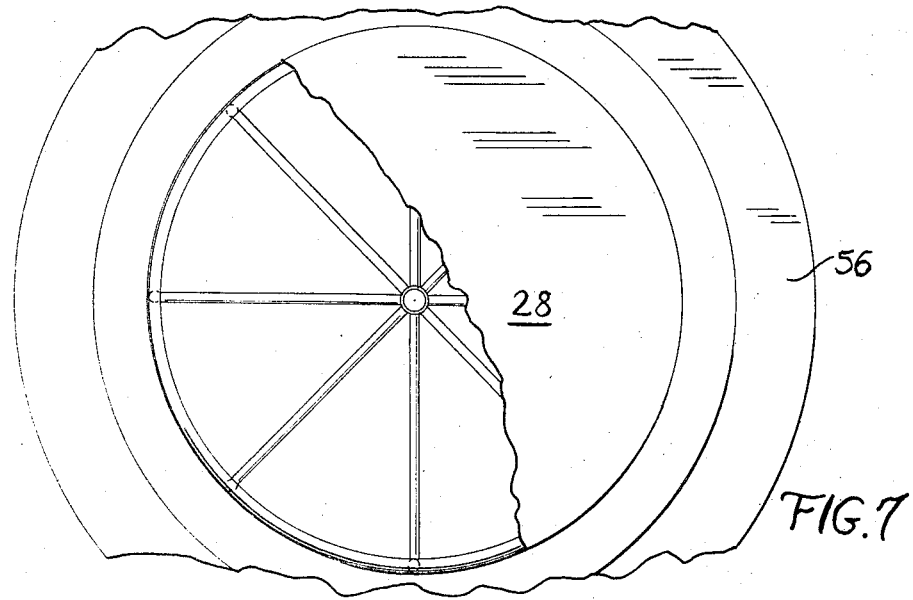
FIGURE 7 is a (partial) top plan view of the drum partly broken away.
Figure 6:
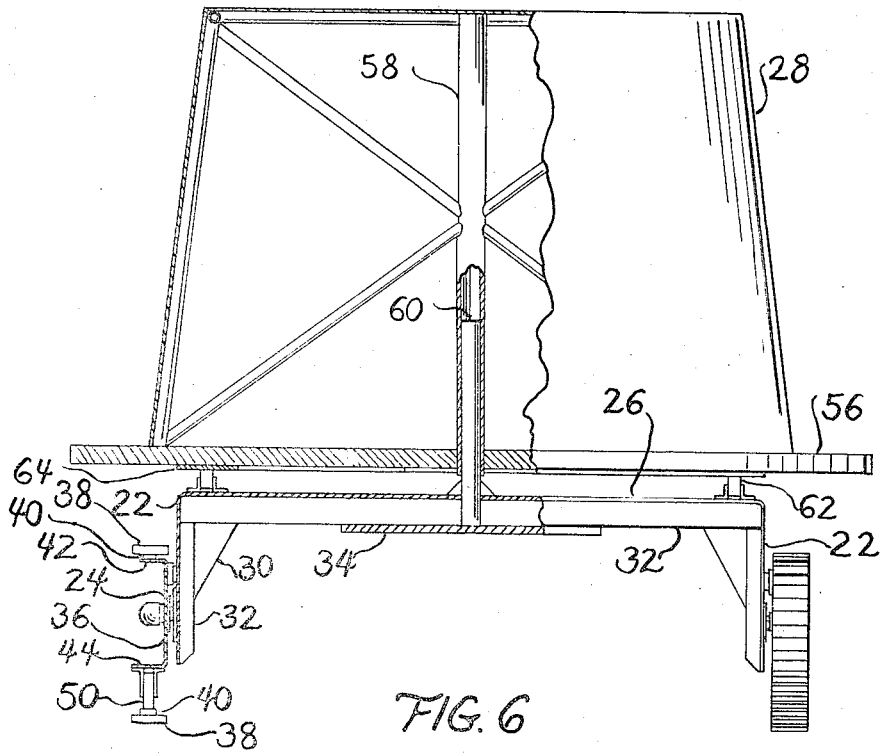
FIGURE 6 is an enlarged (partial) front elevation view partly in section taken on line 6—6 of FIGURE 5.

Referring to the drawings the reference numeral 20 generally designates the main frame of a self-propelled vehicle which comprises the hose handling machine of the present invention. It will be noted that the main frame 20, as best seen in FIGURE 6, is of inverted U shape construction. The vertical sides or legs 22 of the main frame serve as supports for the track frame members 24. The track frame 24 is also of a U shaped figuration as best seen in FIGURE 6 and faces outwardly with an upper flange 42 and a lower flange 44. The main frame 22 is divided with a horizontal top 26 and is further reinforced with braces 30 and ribs 32 and also has a reinforcing plate 34 as best seen in FIGURE 6.

The vertical plate or back 36 of the frame 24 is secured to the side 22 of the main frame as shown in FIGURE 10. It will be noted that the back portion 36 is bolted to an axle 106 which forms a pivot point 100 for the track frame 24 with respect to the main frame side 22.

Referring to FIGURES 8, 9 and 1 it will be noted that outwardly extending pins 102 rigidly secured to the sides 22 of the main frame extend through arcuate slides 112 in the plate 36 of the track frame 24. The outer end of the pin 102 is provided with a sleeve 108 secured thereto and to oppositely disposed compression springs 104 which abut the respective flanges 42 and 44 and the sleeve 108 to which they are fixedly secured. The collar 110 is of larger diameter than the width or dimension of the slot 112 so that the collar 110 rides in the slot 112 and the slot forms a guide for the collar. The purpose of this construction is to permit the track frame to have flexibility with respect to the main frame 20. Thus, the track frame will properly pivot when the track comes to a high spot or a low spot on the ground upon which it is being moved.

It will also be noted that there are rollers 113 positioned by any suitable means between the plate 36 and the side 22 and in contact therewith.

Figure 17:
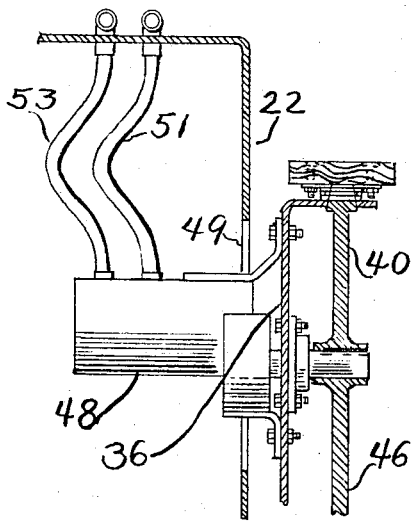
FIGURE 17 is an enlarged section taken on line 17—17 of FIGURE 1.

An endless caterpillar type track 40 is provided for propelling the vehicle along the ground. The track 40 is provided with cleats 38. Track 40 is driven by a sprocket member or wheel 46 as best seen in FIGURE 17. A fluid drive motor 48 having the usual hydraulic inlet and outlet lines 51 and 53 respectively is operatively connected to drive the sprocket wheel 46 which in turn will drive the endless chain 40. The fluid motor 48 is attached or secured to the plate 36 by any well known means.

Referring to FIGURE 1 it will be seen that there are a plurality of conventional idler wheels 50 attached by any suitable means to the lower flange 44 and in contact with the endless chain 40.

Referring to FIGURE 6 the plate 34 is provided with a vertical shaft 60 and a hollow sleeve 58 is disposed so as to rotate on the shaft 60. The sleeve 58 carries a truncated cone shape drum 28 for winding and unwinding an irrigation hose thereon. The lower end of the drum 28 is provided with an outwardly extending annular flange 56 and the flange 56 rotates on a plurality of circumferentially spaced rollers 62 secured by any suitable means to the top 26 of the frame 20. A circular track 64 is secured to the bottom of the flange 56 as best seen in FIGURE 6 for the rollers 62.

Power for locomotion of the hose handling machine as well as the operation of the several devices thereon is supplied by providing a central power plant 66 of the fuel burning type, such as fluid pumps 68 and 70, fluid in a supply tank 72, fluid motors and cylinders at the various devices and places where motors are needed, fluid supply lines properly connected, and control valves conveniently located for the operators.

Figure 15:
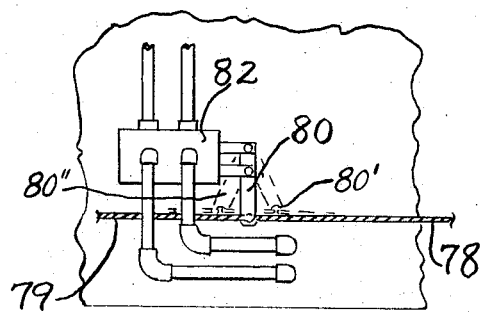
FIGURE 15 is an enlarged (partial) top plan view taken along line 15—15 of FIGURE 1.
Figure 16:
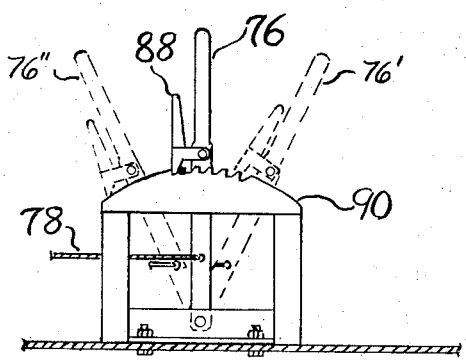
FIGURE 16 is an enlarged elevation view and partial section taken on line 16—16 of FIGURE 5.

To set the vehicle in forward motion the operator sitting in front seat 74 (see FIGURE 5) moves locomotion control levers 76 on each side of seat forward, to the position shown at 86 in FIGURE 16 for fastest speed, causing cable 78 to move valve control lever 80 of drive control valve 82 to position shown at 84 in FIGURE 15. Since drive control valve lever 80 is spring loaded for returning to neutral position there is tension on the cable 78 tending to pull control lever 76 to neutral position. The heel of lock lever 88 automatically drops in notch of frame 90 and holds drive control lever 76 in desired forward position, (see FIGURE 16). To set the vehicle in rearward motion as would be the case when laying the hoses out on the ground preparatory to sprinkling in new location, the forward operator sets the control levers 76 in rearward position at 92 shown in FIGURE 16 to allow the rearward operator in rear seat 94 to take over the locomotion controls. The rearward operator then moves rearward control levers 96 on each side of rear seat shown in FIGURE 5 rearward to the proper position according to the speed desired. Since valve control lever 80 is spring loaded to return to neutral position and also from the reverse position shown at 98 in FIGURE 15 the rearward control levers 96 are made and used similar to forward control levers 76.

Figure 13:
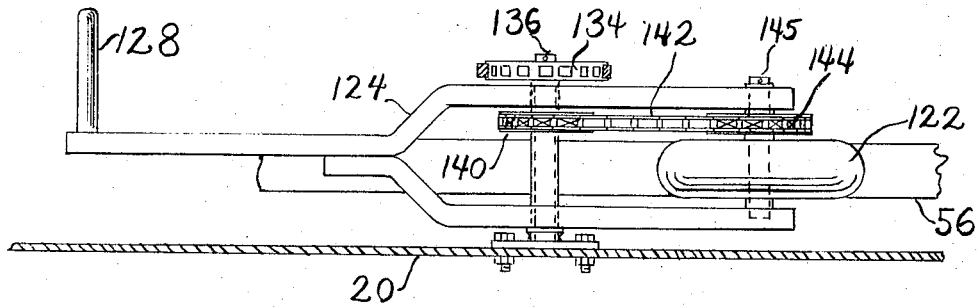
FIGURE 13 is an enlarged section taken on line 13—13 of FIGURE 5.
Figure 14:
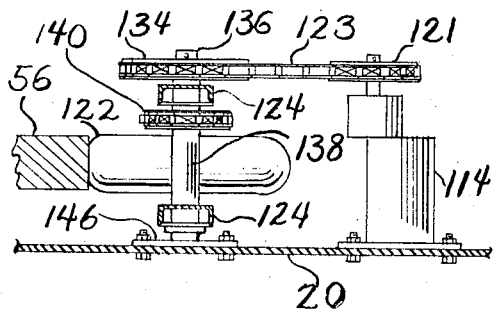
FIGURE 14 is an enlarged elevation view and partial section taken on line 14—14 of FIGURE 5.

Referring to FIGURES 5, 13 and 14 the means for rotating the drum 28 is shown therein. In FIGURE 14 a fluid rotational motor 114 is secured to the frame 20 and is provided with a shaft to which is secured a drive sprocket wheel 121. The sprocket wheel 121 drives another sprocket wheel 134 through a sprocket chain 123 carried by the sprocket wheels 121 and 134. The shaft 136 also has secured or affixed thereto another sprocket wheel 140 which carries a sprocket chain 142 as seen in FIGURE 13 and the chain 142 drives the sprocket wheel 144. The sprocket wheel 144 is fixed to a shaft 145 that has fixed thereto a friction drive wheel 122 which is adapted to frictionally engage the outer surface or periphery of the flange 56 and to rotate it. The shaft 145 is journaled in a yoke or fork member 124 pivotally connected about the shaft 136 and provided with a lever or elongated arm 128 adjacent to the other end. As best seen in FIGURE 5 the yoke member 124 can be moved to the position shown as 130 in dotted lines so that the friction drive wheel 122 can be moved into contact with and out of contact with the flange 56 of the drum 28 so as to rotate it when desired. The shaft 136 extends through a hollow sleeve 138 which carries the yoke 124. The shaft 136 may be disposed in any well known bearing so that it can rotate with respect to the mounting support 146 secured to the frame 20. In FIGURE 5 it will be noted that the motor 114 is provided with a conventional control valve 120 and fluid supply lines 116 and 118.

The present invention is also provided with guide means for properly guiding the winding of the hose 54 when it is desired to reel it up or wind it upon the drum 28.

Referring to FIGURES 1, 11 and 12, the front end of the frame 20 is provided with a C channel bar 158, a vertical column member 160 square shape in cross section, and a vertical tubular pipe or member 162. The column 160 is disposed forwardly of the C channel 158, and inwardly thereof, as best seen in FIGURES 11 and 12 while the tubular member 162 is disposed inwardly of the C channel 158 and rearwardly of the column member 160 so that the three members in effect form a triangular configuration with respect to each other. The members 158, 160 and 162 are all fixedly secured to the frame 20. The tubular member 162 has mounted thereon a pulley 184 which guides the hose and is freely slideable upwardly and downwardly on the tubular member 162. The upper ends of the members 158, 160 and 162 are secured by welding or any other suitable means to a horizontal plate 164, as best seen in FIGURE 5.

In FIGURE 12 it will be seen that a square slide member 168 is disposed for slideable movement on the column 160. The slide member 168 is provided with a shaft 166 facing inwardly on which is journaled a guide pulley 156 that is freely mounted on the shaft 166. The slide member 168 is pivotally connected by a pin 171 to a bracket 170. The bracket 170 in turn is rigidly secured to an L shape bracket 172 that has its leg 173 fixed to the outer surface of an endless drive sprocket chain 174. The endless sprocket chain 174 is carried adjacent to its opposite ends by an upper sprocket wheel 182 (see FIGURE 1) and a lower sprocket wheel 176 (See FIGURE 11). It is thus seen that with the rotation of the drive sprocket 176 the sprocket chain 174 will rotate on the sprocket wheels 176 and 182 and will carry with it the pulley 156 which is attached to the sprocket chain through the members 170, 172 and 173. This will cause the pulley 156 to be continuously reciprocated upwardly and downwardly on the column 160 so that the hose which is carried by the pulley 156 will be properly guided when it is being reeled and unreeled from the winding drum 28. At this time the horizontal pulley 184 will follow the pulley 156 since it is freely mounted on the tubular member 162.

The sprocket wheel 176 is driven through a shaft 178, as shown in FIGURE 11, connected to a drive sprocket 179 on the other end. A bearing 180 secures the shaft 178 to the member 158. A sprocket chain 181 is carried by the sprocket wheel 179 and the sprocket wheel 183 of the drive motor shaft 187.

Referring to FIGURES 1 through 3, there is shown therein an advance lift control guide means which is provided with an elongated arm 185 that is pivotally connected through a pin and bracket 188 fixedly secured to the front edge or end of the frame 20. The arm 185 can be disposed in various positions as shown by the dotted lines in FIGURE 1, with the arm 185 being capable of swinging through an arc. The outer end of the arm 185 is provided with a journaled pulley 196 to guide the hose 54 therein when it is desired to lift it from the ground.

The rear end of the arm 185 has spaced vertical brackets 200 fixed thereto and the upper end of the brackets 200 has an idler pulley 198 journaled therein. The pulley 198 is in alignment with the front pulley 196. A U shape bracket 186 is secured to the brackets 200 and a pivot pin 193 attached to the piston rod 191 of a hydraulic ram 190 is journaled in the bracket 186. The rear end of the hydraulic 190 is fixed by any suitable means to the top 26 of the frame 20. The hydraulic ram is actuated to any well known means not forming part of the present invention. It will be seen that the movement of the piston rod 191 inwardly and outwardly of the cylinder of the ram will cause the elongated arm 185 to pivot from the horizontal position shown in FIGURE 1 either downwardly or upwardly as desired in order to properly guide the hose 54.

Thus, from the foregoing description it is apparent that the present invention provides a hose handling machine that is self-propelled, and which further provides advance guide means for the hose, which guide the hose to another guide means that has a reciprocating movement in a vertical direction and which apparatus further is provided with horizontal guide means for properly positioning the hose as it is reeled and unreeled from its drum.

Thus, the present invention provides an efficient hose handling apparatus for picking up and laying out hoses of large capacity and of long length in a minimum amount of time and a minimum amount of labor and which carefully handles the hose so that there will be no damage or strain to the hose thereby prolonging the useful service life thereof.

Inasmuch as changes may be made in the form, location and relative arrangement of the several parts of this invention without departing from the essential characteristics of the invention, it will be understood that this invention is not to be limited except by the scope of the appended claims.

What is claimed is:

1. An apparatus for winding and unwinding hose and the like therefrom comprising rotatable drum means and hose guide means for lifting the hose from the ground and lifting it in a vertical upwardly and downwardly direction as it is wound on the drum means.

2. An apparatus for reeling hose and the like thereon comprising a vehicle with a main frame, a storage drum means rotatably disposed on said frame, and guide means for guiding the hose onto said drum means including an advance winding guide member, a reciprocating guide member, and a follower guide member.

3. The apparatus of claim 2 wherein said drum means is a truncated cone with a main vertical axis and roller means are disposed on said main frame for supporting the cone.

4. The apparatus of claim 3 wherein said cone has an outwardly extending annular flange on its bottom portion.

5. The apparatus of claim 2 wherein said reciprocating guide means includes a vertical member, a slide disposed for vertical movement on said vertical member, spaced drive sprocket means, endless sprocket means carried by said drive sprocket means, and connecting means securing said endless sprocket means to said slide means, and pulley means carried by said slide for receiving a portion of the hose thereover.

6. The apparatus of claim 5 wherein said follower guide member includes a vertical tubular member with a pulley freely slideable thereon, said pulley being horizontally positioned and disposed adjacent said pulley means.

7. The apparatus of claim 2 wherein said advance winding means includes an elongated arm, a pulley on the end of said arm, and ram means for moving said arm through an arc of a circle.

8. An apparatus for reeling hose, cable and the like comprising a main frame with a rotatable winding drum supported thereon and vertical guide means thereon for guiding hose and the like as it is wound on said drum, said guide means including a vertical pipe, a horizontal pulley slidably mounted thereon, a column, a slide mounted on said column for reciprocating movement thereon, a vertical pulley carried by said slide, and an endless chain drive means for moving said slide in a vertical reciprocating direction, including a vertical channel, spaced upper and lower sprocket wheels secured to said channel, an endless chain sprocket carried by said wheels, an L-shaped member fixed to said endless chain for movement in one direction only with respect to said wheels, and means fastening said L-shaped member to said slide.

9. The apparatus of claim 8 wherein the guide means includes an elongated arm with a pulley on it pivotally connected to the front end of the main frame, and hydraulic ram means operatively connected to said arm for moving it through an arc of a circle.

10. The apparatus of claim 9 wherein means are provided for rotating said drum including a friction wheel, and endless sprocket wheel drive means operatively connected to said friction wheel for driving it.

11. The apparatus of claim 10 wherein bracing means are provided for normally urging said frictional wheel said contact with said drum.

12. The apparatus of claim 11 wherein said drum has an annular flange and said friction wheel contacts said flange.

13. The apparatus of claim 12 wherein said friction wheel is disposed on one end of an elongated arm secured to the main frame.

References Cited

UNITED STATES PATENTS

| 241,961 | 5/1881 | Gilbert | 242—86.2 |
| 2,570,573 | 10/1951 | Lilboiron | 242—86.2 X |
| 2,625,344 | 1/1953 | Flansburgh | 242—86.2 X |
| 2,633,309 | 3/1953 | Beck | 242—86.51 |
| 2,941,746 | 6/1960 | Hunt | 242—158 |

STANLEY N. GILREATH, *Primary Examiner.*

N. L. MINTZ, *Assistant Examiner.*